Patented Sept. 25, 1945

2,385,548

UNITED STATES PATENT OFFICE 2,385,548

PROCESS FOR PREPARATION OF ACETYLENIC ALCOHOLS

Everet F. Smith, Terre Haute, Ind., assignor to Commercial Solvents Corporation, Terre Haute, Ind., a corporation of Maryland No Drawing. Application November 29, 1943, Serial No. 512,262

16 Claims. (Cl. 260—638)

My invention relates to a process for the preparation of acetylenic alcohols. More particularly, it relates to a process capable of producing high yields of the desired acetylenic alcohol by the utilization of a novel type of menstruum for the involved reaction.

It has been known for some time that acetylenic alcohols can be prepared by absorbing an acetylenic hydrocarbon in a suspension of finely ground, substantially anhydrous potassium hydroxide in an ether compound chosen from the class consisting of acetals and polyethers, then adding a suitable carbonyl compound, and thereafter hydrolyzing the resultant acetylenic alcohol potassium derivative to the desired product. In this particular procedure, the reaction menstruum is prepared by adding finely divided, substantially anhydrous potassium hydroxide to the ether compound at ordinary temperatures, ranging usually up to 35° C.; and after the completion of the process, an aqueous solution of potassium hydroxide remains, from which the potassium hydroxide must be isolated in the anhydrous state and pulverized for reuse. This is the chief disadvantage of the process. It will readily be apparent to those skilled in the art that such a requirement renders this process substantially useless from an industrial point of view, since it is not economically feasible to recover large quantities of anhydrous potassium hydroxide from aqueous solution by conventional methods, and then to pulverize it under anhydrous conditions for reuse. Furthermore, the yields of acetylenic alcohol obtained by this process, per unit volume of reactor space, are very poor.

In my copending application, U. S. Serial No. 512,261, filed November 29, 1943, there is described and claimed an improved process for the production of acetylenic alcohols which involves the utilization of a comparatively small quantity of a suitable monohydric alcohol compound as an activator in reaction menstruums employed in the manufacture of said acetylenic alcohols. Specifically, the method claimed in the aforesaid copending application entails the preparation of a suitable reaction menstruum by heating a mixture consisting of potassium hydroxide, a water-insoluble inert liquid, and a monohydric alcohol. When no alcohol is present in such mixtures during the heating step, there is produced very little, if any, acetylenic alcohol in the subsequent reaction of acetylenic hydrocarbon with the desired carbonyl compound. Neither are such menstruums effective if the mixture of potassium hydroxide, water-insoluble inert liquid, and monohydric alcohol is not heated prior to carrying out the reaction.

I have now discovered that acetylenic alcohols may be synthesized in very high yields and conversions and greatly improved reactor outputs by employing a reaction menstruum prepared by heating a mixture consisting of potassium hydroxide, an ether compound such as an acetal or a polyether, and a small proportion of a primary monohydric alcohol until the potassium hydroxide is in a partially or completely molten state, and thereafter cooling said mixture while agitating. As pointed out above, reaction media have previously been utilized which consisted of crushed anhydrous potassium hydroxide suspended in an acetal or polyether; however, the practice employed in connection with this type of reaction menstruum did not involve heating such mixtures either in the presence or absence of a monohydric alcohol. By adding an alcohol of the aforesaid type to a potassium hydroxide-acetal or -polyether mixture, and thereafter heating the mixture until the potassium hydroxide becomes molten, I am able to condense acetylenic hydrocarbons with suitable carbonyl compounds to obtain the corresponding acetylenic alcohols in yields per unit volume of menstruum, which are substantially three times in excess of those secured by utilizing the menstruums provided by prior art processes.

In its preferred embodiment, the process of the present invention first involves the addition of an acetal or polyether with the desired proportion of primary monohydric alcohol to an aqueous solution of potassium hydroxide, and the removal of the water therefrom by distillation as the azeotrope with the ether compound and alcohol, separating the water from the distillate, and returning the ether compound and alcohol to the still kettle. This operation is continued until no more water distills over. The still residue thus obtained is not completely anhydrous, but on the contrary, contains approximately 13 per cent water. This water, however, does not behave like free water; it cannot be removed by further distillation, and is apparently loosely combined with the potassium hydroxide. The latter conclusion is considered highly probable in view of the fact that the potassium hydroxide, thus obtained, melts between 104° C. and 106° C., whereas pure potassium hydroxide melts at approximately 380° C. In this connection, the expression "free water," hereinafter referred to, is to be construed as meaning only that water which may be removed from mixtures of the above-mentioned type by distillation of the water azeotrope. It should be pointed out, however, that while I prefer to utilize a reaction menstruum that contains substantially no free water, my process is operative and improved results can still be obtained with menstruums having a water content of up to slightly below 1 mole per mole of potassium hydroxide. On the other hand, finely-divided anhydrous potassium hydroxide may be employed in the process of my invention, with highly satisfactory results. Chiefly for economical reasons, however, potassium hydroxide in this form is generally undesirable, especially since good results are obtained with the hydroxide containing approximately 13 per cent water, and produced in the manner indicated above.

After all of the excess water has thus been removed, a mixture is obtained which consists of two liquid layers, the upper layer containing chiefly the ether compound and alcohol, and the lower layer consisting essentially of potassium hydroxide with 13% water. This mixture is thoroughly agitated and cooled to a temperature of from about −10° C. to about +10° C. In this connection it may be mentioned that although the aforesaid temperature range has generally been found preferable, I may utilize temperatures ranging from slightly above the freezing point of the potassium hydroxide-containing mixture to about 35° C. When the desired temperature is reached a 1-alkyne having a hydrogen atom in the one-position is slowly introduced until said 1-alkyne is no longer absorbed by the mixture. The desired carbonyl compound is then added thereto in an amount approximately equal to the number of moles of alkyne, and as a result, the potassium derivative of the corresponding acetylenic alcohol is formed. After this step in the process is complete, water is added to the mixture in order to hydrolyze the aforesaid derivative to the parent acetylenic alcohol. The crude reaction mixture thus obtained is then subjected to fractional distillation under vacuum, the latter being sufficiently high to reduce the boiling point of the acetylenic alcohol-water azeotrope to a value below the temperature at which said alcohol decomposes in the presence of alkali, such temperature of distillation normally being not appreciably above 90° C. Generally, pressures of 500 mm. or below will be required for this purpose. As a result of this distillation, a mixture of acetylenic alcohol and water is obtained. The water may then be conveniently removed in a known manner by adding thereto a liquid which forms an azeotrope with water, and thereafter subjecting said mixture to fractional distillation. Examples of liquids suitable for this purpose are benzene, toluene, xylene, petroleum naphtha, and the like.

While the above-described procedure constitutes a preferred form of my invention, I have found that solid potassium hydroxide may be substituted for the aforesaid aqueous solution thereof, with highly satisfactory results. If potassium hydroxide containing less than 13% water is used, it must first be pulverized. The resulting powder is then suspended in the mixture of alcohol and ether compound, and the slurry is agitated and heated until partial fusion occurs. Thereafter, the mixture is cooled and simultaneously agitated, and the resulting menstruum is utilized in the same manner as described in the foregoing paragraph.

Solid potassium hydroxide containing 13% water or up to slightly below one mole of water per mole of potassium hydroxide may be introduced directly without being pulverized into the mixture of alcohol and ether compound, and the resulting mixture heated until substantially complete fusion of the potassium hydroxide occurs. The minimum required temperature has been observed to vary inversely as the proportion of water, being approximately 105° C. for potassium hydroxide containing 13% water. A two-phase liquid mixture results, composed essentially of the alcohol and the ether compound in the upper layer, and potassium hydroxide and water in the lower layer. The mixture is then cooled and simultaneously agitated, and the resulting menstruum is utilized in the manner hereinbefore described.

With either of the above procedures, it should be pointed out that the mixture of potassium hydroxide, acetal or polyether, and alcohol must be heated and then cooled prior to absorption of the 1-alkyne and reaction of the ensuing product with a carbonyl compound, in order to obtain the improvement in yield of acetylenic alcohols made possible by my invention.

Insofar as I have been able to determine, my process is operative with any primary monohydric aliphatic alcohol containing from four to eight carbon atoms. As examples of these alcohols, there may be mentioned 1-butanol, methylallyl alcohol, 1-pentanol, isoamyl alcohol, and 1-octanol. In this connection, it is to be specifically understood that the term "primary monohydric aliphatic alcohol containing from four to eight carbon atoms," as used in the present description, is to be construed to include, in addition to the above-mentioned alcohols, other compounds containing an alcohol group, such as, for example, ethylene glycol monoethyl ether, diethylene glycol monoethyl ether, and the like. The proportion of alcohol utilized may vary considerably. However, it has been my general observation that satisfactory results are consistently obtained when from about 2 to 35 per cent of the alcohol, based on the total volume of the reaction menstruum, is utilized.

The optimum temperature employed in condensing the carbonyl compound with the 1-alkyne will, in general, be found within the range of about −10° and +90° C., the carbonyl compounds of higher molecular weight ordinarily requiring higher reaction temperatures for satisfactory results.

As far as I have been able to determine, the applicability of the process of the present invention is restricted to carbonyl compounds which do not undergo extensive and undesirable side reactions in the alkaline menstruum utilized. Aliphatic ketones are not deleteriously affected by such a reaction medium, and therefore, it is to be specifically understood that I consider aliphatic ketones, as a class, to be operative in the process of my invention. In addition, as examples of aldehydes that are operative in my process, there may be mentioned butyraldehyde, hexaldehyde, heptaldehyde, 2-ethylhexaldehyde, and the like.

In preparing the reaction menstruums of the present invention, the acetal or polyether in which the potassium hydroxide is suspended may be any of several compounds; for example, 1,1-dibutoxyethane, 1,1 - diethoxybutane, 1,1 - dibutoxy-2-ethylhexane, 1,1-dipropoxybutane, dibutoxyphenylmethane, 1,1-dibutoxybutane, 1,1-dibutoxy - 2 - phenylethane, 1,2-diethoxyethane, diethylene glycol diethyl ether, 1,2-diethoxypropane, 2,3-diethoxybutane, 2,3-dibutoxybutane, 4,5-dimethyl-2-propyl-1,3-dioxolane, dimethoxymethane, and the like.

The quantity of such compounds may vary considerably. They may be employed in considerable excess without having an adverse effect on the activity of the finely divided potassium hydroxide used in my process. However, for any given quantity of potassium hydroxide, I have found that the maximum conversion and reactor output may be secured by using the ether compound in a proportion just high enough to allow the formation of a menstruum that is sufficiently fluid for satisfactory agitation at the reaction temperature employed.

Examples of alkynes suitable for use in my process include, but are not limited to, acetylene, propyne, 1-pentyne, phenylacetylene, and the like.

As examples of acetylenic alcohols which may be synthesized in accordance with my invention, there may be mentioned 2-methyl-3-butyne-2-ol, 3-methyl-1-pentyne-3-ol, 2-methyl-3-pentyne-2-ol, 4-ethyl-1-octyne-3-ol, 6-ethyl-3-decyne-5-ol, 1-nonyne-3-ol, 1-hexyne-3-ol, 3,5-dimethyl-1-hexyne-3-ol, and 3-methyl-1-nonyne-3-ol.

My invention may be further illustrated by the following specific examples:

Example I

A mixture consisting of 558 ml. of 1,1-dibutoxyethane, 42 ml. of butanol, and 187 grams of potassium hydroxide (U. S. P. pellets, containing 13% water) was refluxed for 15 minutes at a liquid temperature of 188° C., during which time two liquid layers were formed. The mixture was then cooled to −10° C. with agitation, and thereafter, 18.4 grams of acetylene and 41.0 grams of acetone were added successively. Agitation was continued for approximately 15 minutes, and then 364 ml. of water was added to hydrolyze the product. The result was two liquid layers, the upper layer containing 1,1-dibutoxyethane, butanol, and 2-methyl-3-butyne-2-ol, and the lower layer containing potassium hydroxide, water and a small quantity of 2-methyl-3-butyne-2-ol. For the sake of convenience in the laboratory, the two layers were separated before distillation, the upper layer was treated with solid carbon dioxide to neutralize entrained potassium hydroxide, and it was then distilled. The lower layer was distilled under vacuum at a liquid temperature below 90° C. The 2-methyl-3-butyne-2-ol isolated in this manner amounted to 55.1 grams, representing a yield of 92.8 per cent, based upon the acetone consumed, and a reactor output of 80.6 grams per liter of menstruum.

In contrast with the results cited in Example I, the following example will show the inferior results produced by the prior-art process, in which activation of the menstruum by adding an alcohol and heating was not employed.

Example II

Potassium hydroxide (U. S. P. pellets containing 13% water) were crushed to a fine powder, and 187 grams of the material was introduced into 600 ml. of pure 1,1-dibutoxyethane at −10° C. The slurry was then agitated and saturated with acetylene, a total of 9.4 grams being absorbed. Thereafter, the equivalent amount of acetone, 20.9 grams, was added, agitation was continued for 15 minutes, and then 364 ml. of water was added to hydrolyze the product. From the hydrolyzed mixture, 19.7 grams of 2-methyl-3-butyne-2-ol was isolated as described in Example I, representing a conversion of 65%, based on acetone, and a reactor output of 28.8 grams per liter of menstruum.

Example III

A mixture consisting of 558 ml. of 4,5-dimethyl-2-propyl-1,3-dioxolane, 42 ml. of butanol, and 187 grams of potassium hydroxide, was refluxed for 15 minutes at a liquid temperature of 150° C., during which time two liquid layers were formed. The mixture was then cooled to −10° C. with agitation, and thereafter 25.8 grams of acetylene and 57.6 grams of acetone were successively added. After this mixture had been thoroughly agitated, 364 ml. of water was added thereto with agitation, and from the hydrolyzed mixture 54.7 grams of 2-methyl-3-butyne-2-ol was isolated as set forth in Example I, representing a conversion of 66 per cent, based on the acetone used, and a reactor output of 80.1 grams per liter of menstruum.

Example IV

A mixture consisting of 558 ml. of diethylene glycol diethyl ether, 42 ml. of butanol, and 187 grams of potassium hydroxide (U. S. P. pellets, containing 13% water) was refluxed for 15 minutes at a liquid temperature of 123° C., during which time two liquid layers were formed. Thereafter, the mixture was cooled to −10° C. with agitation, and saturated with 48.3 grams of acetylene. To the solution thus formed was then added, with agitation, 107.8 grams of acetone. The resultant mixture was next hydrolyzed as previously described, and from the hydrolyzed material 62.3 grams of 2-methyl-3-butyne-2-ol was obtained, representing a conversion of 40 per cent, based upon the acetone used, and a reactor output of 91.2 grams per liter of menstruum.

Example V

A mixture consisting of 558 ml. of 1,1-dibutoxyethane, 42 ml. of isoamyl alcohol and a solution of 163 grams of pure potassium hydroxide in 388 ml. of water was heated in a still kettle and the water removed therefrom in the form of its azeotrope with 1,1-dibutoxy-ethane, the latter being separated from the distillate and continuously returned to the kettle. After water had stopped coming over in the distillate, two liquid layers remained in the kettle. These layers were then cooled to −10° C. and simultaneously agitated, and to the resulting menstruum were added successively 19.1 grams of acetylene and 42.6 grams of acetone. After this mixture had been agitated 15 minutes, 364 ml. of water was added thereto with agitation, and from the hydrolyzed mixture 49.5 grams of 2-methyl-3-butyne-2-ol was isolated as described in Example I, representing a conversion of 80.4 per cent, based on the acetone used, and a reactor output of 72.5 grams per liter.

Example VI

Into a suitable reactor were charged 133 pounds of 1,1-dibutoxyethane, 50 pounds of commercial flaked caustic potash, and 9.1 pounds of butanol. This mixture was then heated to a temperature of 170° C., and held at that temperature for about one hour. Thereafter, the mixture was cooled to 0° C. Acetylene was then introduced into the cooled mixture, and a total of 4 pounds was absorbed. To the resulting solution, 13.9 pounds of isobutyl methyl ketone was added, and the crude product was treated in the same manner as indicated by the above examples. As a result, there was obtained 12.94 pounds of 3,5-dimethyl-1-hexyne-3-ol, corresponding to a conversion of 74 per cent, based on isobutyl methyl ketone, and a reactor output of 121 grams per liter of menstruum.

The results appearing in the table below demonstrate typical carbonyl compounds that may be utilized in my process, and also indicate the various reaction conditions utilized in obtaining optimum conversions. In this series of experiments, a mixture of 558 ml. of acetal or polyether, 42 ml. of the alcohol, and 187 grams of potassium hydroxide (U. S. P. pellets containing 13% water) were employed. This mixture was refluxed for 15 minutes, and then cooled to −10° C., at which temperature the acetylene was absorbed.

results demonstrating the use of various acetals and polyethers that may be utilized as a medium for preparing a menstruum suitable for condensing carbonyl compounds with alkynes in accordance with my invention. The reactor charge consisted of 558 ml. of the medium, 42 ml. of butanol, and 187 grams of potassium hydroxide (U. S. P. pellets, 13% water). This mixture was refluxed for a period of fifteen minutes, after which it was cooled to −10° C. and acetylene was introduced until the menstruum was saturated. A quantity of acetone corresponding to the molecular quantity of acetylene absorbed was then introduced at a temperature of −10° C. The crude reaction mixture was thereafter processed in accordance with the procedure outlined in Example I, and the resultant 2-methyl-3-butyne-2-ol thus formed was isolated.

*Table I*

| Carbonyl compound | Product | Medium | Alcohol | Reaction Temp., °C. | Reaction Time, hr. | Acetylene absorption ft.$^3$, STP | Ratio acetylene to carbonyl compound moles/mole | Conversion,* per cent | Menstruum output,† g/l. |
|---|---|---|---|---|---|---|---|---|---|
| Acetone | 2-methyl-3-butyne-2-ol | 1,1-dibutoxyethane | Butanol | −10 | 0.25 | 0.560 | 1.00 | 92.8 | 80.6 |
| Ethyl methyl ketone | 2-methyl-1-pentyne-3-ol | 1,1-diethoxybutane | Isoamyl alcohol | −10 | 0.25 | 0.395 | 1.07 | 93 | 62 |
| Isobutyl methyl ketone | 2,5-dimethyl-1-hexyne-3-ol | ...do... | Butanol | 0 | 0.25 | 0.664 | 1.10 | 74 | 121 |
| Hexyl methyl ketone | 3-methyl-1-nonyne-3-ol | 1,1-dibutoxyethane | Isobutyl alcohol | 30 | 1.0 | 0.481 | 1.00 | 71 | 98 |
| Butyraldehyde | 1-hexyne-3-ol | ...do... | Butanol | −10 | 0.25 | 0.507 | 1.00 | 100 | 96 |
| Heptaldehyde | 1-nonyne-3-ol | 1,1-diethoxybutane | ...do... | 33 | 4.0 | 0.805 | 1.15 | 12.7 | 18.6 |
| 2-ethylhexaldehyde | 4-ethyl-1-octyne-3-ol | 1,1-dibutoxyethane | ...do... | 25 | 1.0 | 0.473 | 1.00 | 25.8 | 34.8 |

* Basis, carbonyl compound.
† Weight of product per unit volume of menstruum.

The data appearing in the table below illustrate the ability of various alcohols to improve the yield of 2-methyl-3-butyne-2-ol when employed as hereinbefore described in the preparation of a reaction menstruum consisting of a finely-divided suspension of potassium hydroxide in a suitable acetal or polyether. In this particular series of experiments, the reactor charge consisted of 558 ml. of redistilled 1,1-dibutoxyethane, 187 grams of potassium hydroxide (U. S. P. pellets, containing 13% water) and 42 ml. of the specified alcohol. In each case the runs were carried out in accordance with the procedure outlined in Example I.

*Table II*

| Alcohol | Conversions, based on acetone per cent | Menstruum output [1] g./l. |
|---|---|---|
| None [2] | 65 | 28.8 |
| 1-propanol | 89 | 40.7 |
| 1-butanol | 93 | 80.7 |
| Isobutyl alcohol | 79 | 55.0 |
| Methylallyl alcohol | 83 | 45.0 |
| 1-pentanol | 91 | 63.0 |
| 3-methyl-1-butanol (isoamyl alcohol) | 80 | 72.5 |
| 1-octanol | 84 | 43.6 |
| Undecanol | 77 | 41.2 |
| Diethylene glycol monoethyl ether | 73 | 42.4 |
| Tetrahydrofurfuryl alcohol | 88 | 39.5 |

[1] Weight of product per unit volume of reaction menstruum.
[2] Unheated menstruum.

In the table which follows there are shown

*Table III*

| Medium | Acetylene absorption, ft.$^3$, STP | Ratio acetylene to acetone, moles/mole | Conversion,* percent | Menstruum output,† g./l. |
|---|---|---|---|---|
| 1,1-dibutoxyethane | 0.560 | 1.00 | 93 | 80.7 |
| 4,5-dimethyl-2-propyl-1,3-dioxalane | 0.784 | 1.00 | 66 | 80.1 |
| Diethylene glycol diethyl ether | 1.468 | 1.00 | 40 | 91.2 |

* Basis, acetone.
† Weight of product per unit volume of menstruum.

While the above examples are illustrative of certain monohydric alcohols capable of producing high yields of acetylenic alcohols in accordance with my invention, it is to be specifically understood that I do not desire to be limited thereto since it is obvious that there are other alcohols in addition to those named that will likewise be satisfactory for use in my process. Also, it is to be understood that the composition of the reaction menstruum employed may vary rather widely and is not limited to the compositions specifically mentioned herein, since other similar acetals or polyethers will at once be apparent to those skilled in the art. Moreover, when utilizing an aqueous solution of potassium hydroxide in accordance with the process of my invention, the activating alcohol need not be added until all of the free water has been removed from the mixture. In general, it may be said that any modification or equivalents that would naturally occur to those skilled in the art are included within the scope of my invention.

Having described my invention, what I claim is:

1. In a process for the synthesis of acetylenic alcohols, the improvements which comprise heating a mixture consisting essentially of potassium hydroxide, an ether compound selected from the group consisting of alkyl acetals and polyethers, and a small proportion of a primary monohydric aliphatic alcohol containing from 4 to 8 carbon atoms, to the point at which the potassium hydroxide is at least partially melted, cooling the heated mixture while agitating the same, absorbing a 1-alkyne having a hydrogen atom in the one-position in the cooled mixture, thereafter adding to the said mixture a carbonyl compound selected from the group consisting of an aliphatic aldehyde containing from 4 to 8 carbon atoms and aliphatic ketones, hydrolyzing the resulting product to the corresponding acetylenic alcohol, and separating the latter.

2. In a process for the synthesis of acetylenic alcohols, the steps which comprise heating a mixture consisting essentially of potassium hydroxide, an ether compound selected from the group consisting of alkyl acetals and polyethers, and a small proportion of a primary monohydric aliphatic alcohol containing from 4 to 8 carbon atoms to a temperature sufficient to produce a two-phase liquid mixture in which one phase consists essentially of potassium hydroxide, and the other phase consists essentially of said ether compound and primary monohydric aliphatic alcohol and sufficient to cause at least partial fusion of the potassium hydroxide, subsequently cooling the mixture while agitating the same, introducing a 1-alkyne having a hydrogen atom in the one-position into the cooled mixture, thereafter introducing into said mixture a carbonyl compound selected from the group consisting of an aliphatic aldehyde containing from 4 to 8 carbon atoms and aliphatic ketones, hydrolyzing the resulting product to the corresponding acetylenic alcohol, and separating the latter.

3. In a process for the synthesis of acetylenic alcohols, the improvements which comprise heating a mixture consisting essentially of potassium hydroxide, and ether compounds selected from the group consisting of alkyl acetals and polyethers, and from about 2 to 35 per cent of a primary monohydric aliphatic alcohol containing from 4 to 8 carbon atoms to the point at which the potassium hydroxide is at least partially melted, cooling the mixture while agitating the same, absorbing a 1-alkyne having a hydrogen atom in the one-position in a cooled menstruum, thereafter introducing into said menstruum a carbonyl compound selected from the group consisting of an aliphatic aldehyde containing from 4 to 8 carbon atoms and an aliphatic ketone, hydrolyzing the resulting product to the corresponding acetylenic alcohol, and separating the latter.

4. The process of claim 3 in which the ether compound is 1,1-dibistoxyethane.

5. The process of claim 3 in which the ether compound is 4,5-dimethyl-2-propyl-1,3-dioxolane.

6. The process of class 3 in which the ether compound is diethyleneglycol diethyl ether.

7. The process of claim 3 in which the primary monohydric aliphatic alcohol is butanol.

8. The process of claim 3 in which the primary monohydric aliphatic alcohol is isobutyl alcohol.

9. The process of claim 3 in which the primary monohydric aliphatic alcohol is isoamyl alcohol.

10. In a process for the synthesis of acetylenic alcohols, the steps which comprise heating an aqueous mixture of potassium hydroxide, a small proportion of a primary monohydric aliphatic alcohol containing from 4 to 8 carbon atoms, and an ether compound selected from the group consisting of alkyl acetals and polyethers to a temperature sufficient to remove the free water therefrom in the form of the azeotrope with said ether compound and alcohol and sufficient to cause at least partial fusion of the potassium hydroxide, separating the ether compound and alcohol from the water so distilled, returning the ether compound and alcohol to the still residue, thereafter cooling the menstruum while agitating the same, absorbing a 1-alkyne having a hydrogen atom in the one-position in the cooled menstruum, subsequently introducing into said cooled menstruum a carbonyl compound selected from the group consisting of an aliphatic aldehyde containing from 4 to 8 carbon atoms and an aliphatic ketone, hydrolyzing the resulting product to the corresponding acetylenic alcohol, and separating the latter.

11. The process of claim 10 in which the primary monohydric aliphatic alcohol utilized is present in the menstruum in a concentration ranging from about 2 to 35 per cent based on the total volume of the reaction menstruum.

12. The process of claim 10 in which the reaction menstruum utilized has a total water content of less than one mole per mole of potassium hydroxide present therein.

13. In a process for the synthesis of acetylenic alcohols, the improvements which comprise heating a mixture consisting essentially of potassium hydroxide, an ether compound selected from the group consisting of alkyl acetals and polyethers and a small proportion of a primary monohydric aliphatic alcohol containing from 4 to 8 carbon atoms to the point at which the potassium hydroxide is at least partially melted, cooling the heated mixture while agitating the same, absorbing a 1-alkyne having a hydrogen atom in the one-position in the cooled mixture, thereafter introducing into said mixture a carbonyl compound selected from the group consisting of an aliphatic aldehyde containing from 4 to 8 carbon atoms and an aliphatic ketone at a temperature ranging from between about −10 to +90° C., hydrolyzing the resulting product to the corresponding acetylenic alcohol, and separating the latter.

14. The process of claim 10 in which the 1-alkyne is acetylene and the carbonyl compound is acetone.

15. The process of claim 10 in which the 1-alkyne is acetylene and the carbonyl compound is butyraldehyde.

16. The process of claim 10 in which the 1-alkyne is acetylene and the carbonyl compound is isobutyl-methyl ketone.

EVERET F. SMITH.